(12) United States Patent
Bruck

(10) Patent No.: US 10,046,413 B2
(45) Date of Patent: Aug. 14, 2018

(54) METHOD FOR SOLID STATE ADDITIVE MANUFACTURING

(71) Applicant: Siemens Energy, Inc., Orlando, FL (US)

(72) Inventor: Gerald J. Bruck, Titusville, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 86 days.

(21) Appl. No.: 15/045,293

(22) Filed: Feb. 17, 2016

(65) Prior Publication Data

US 2017/0232550 A1     Aug. 17, 2017

(51) Int. Cl.
| | |
|---|---|
| *B23K 20/06* | (2006.01) |
| *B23K 26/342* | (2014.01) |
| *B23P 6/00* | (2006.01) |
| *C23C 24/04* | (2006.01) |
| *F01D 5/00* | (2006.01) |
| *C23C 24/02* | (2006.01) |
| *C23C 24/08* | (2006.01) |
| *B33Y 10/00* | (2015.01) |

(52) U.S. Cl.
CPC ............ *B23K 20/06* (2013.01); *B23K 26/342* (2015.10); *B23P 6/007* (2013.01); *B33Y 10/00* (2014.12); *C23C 24/02* (2013.01); *C23C 24/04* (2013.01); *C23C 24/08* (2013.01); *F01D 5/005* (2013.01)

(58) Field of Classification Search
CPC ........ B23K 26/342; B23K 20/06; B23K 9/04; B23K 9/042; B23K 9/046; B23K 9/048; B23K 37/06; B23K 9/22; B23K 9/232; B23K 26/323; F01D 5/005; C23C 24/04; B23P 6/007

USPC ...................................................... 219/76.12
See application file for complete search history.

(56) References Cited

U.S. PATENT DOCUMENTS

| | | | | |
|---|---|---|---|---|
| 3,502,897 A | * | 3/1970 | McCollister | ........... B23K 9/091 219/130.4 |
| 3,520,049 A | | 7/1970 | Lysenko et al. | |
| 4,513,188 A | * | 4/1985 | Katzenstein | ........... B23K 20/06 219/617 |

(Continued)

FOREIGN PATENT DOCUMENTS

| | | |
|---|---|---|
| DE | 102012018286 A1 | 3/2014 |
| DE | 102013014156 A1 | 2/2015 |

OTHER PUBLICATIONS

PCT International Search Report and Written Opinion of International Searching Authority dated Apr. 19, 2017 corresponding to PCT International Application No. PCT/US2017/013692 filed Jan. 17, 2017.

*Primary Examiner* — Dana Ross
*Assistant Examiner* — Kuangyue Chen

(57) ABSTRACT

A method for forming an impact weld used in an additive manufacturing process. The method includes providing a wire having a powder filler metal core located within a sheath. The wire is then inserted within a conduit having an opening. Further, the method includes providing at least one energy pulse that interacts with the sheath to pinch off at least one segment of the wire, wherein the energy pulse causes propulsion of the segment toward a substrate with sufficient velocity to form an impact weld for welding the metal core to the substrate. In particular, the energy pulse is an electromagnetic pulse, a laser energy pulse or a high electric current pulse.

8 Claims, 4 Drawing Sheets

(56) References Cited

U.S. PATENT DOCUMENTS

| | | | |
|---|---|---|---|
| 2002/0011467 A1* | 1/2002 | Takeuchi | B23K 35/304 |
| | | | 219/76.16 |
| 2005/0058851 A1* | 3/2005 | Smith | B21C 23/22 |
| | | | 428/685 |
| 2007/0207931 A1* | 9/2007 | Rissanen | B22F 7/04 |
| | | | 505/430 |
| 2011/0000953 A1 | 1/2011 | Daehn et al. | |
| 2013/0064993 A1 | 3/2013 | Rubenchik et al. | |
| 2013/0283878 A1 | 10/2013 | Vivek et al. | |
| 2014/0203007 A1* | 7/2014 | Uecker | B23K 9/1068 |
| | | | 219/130.51 |

* cited by examiner

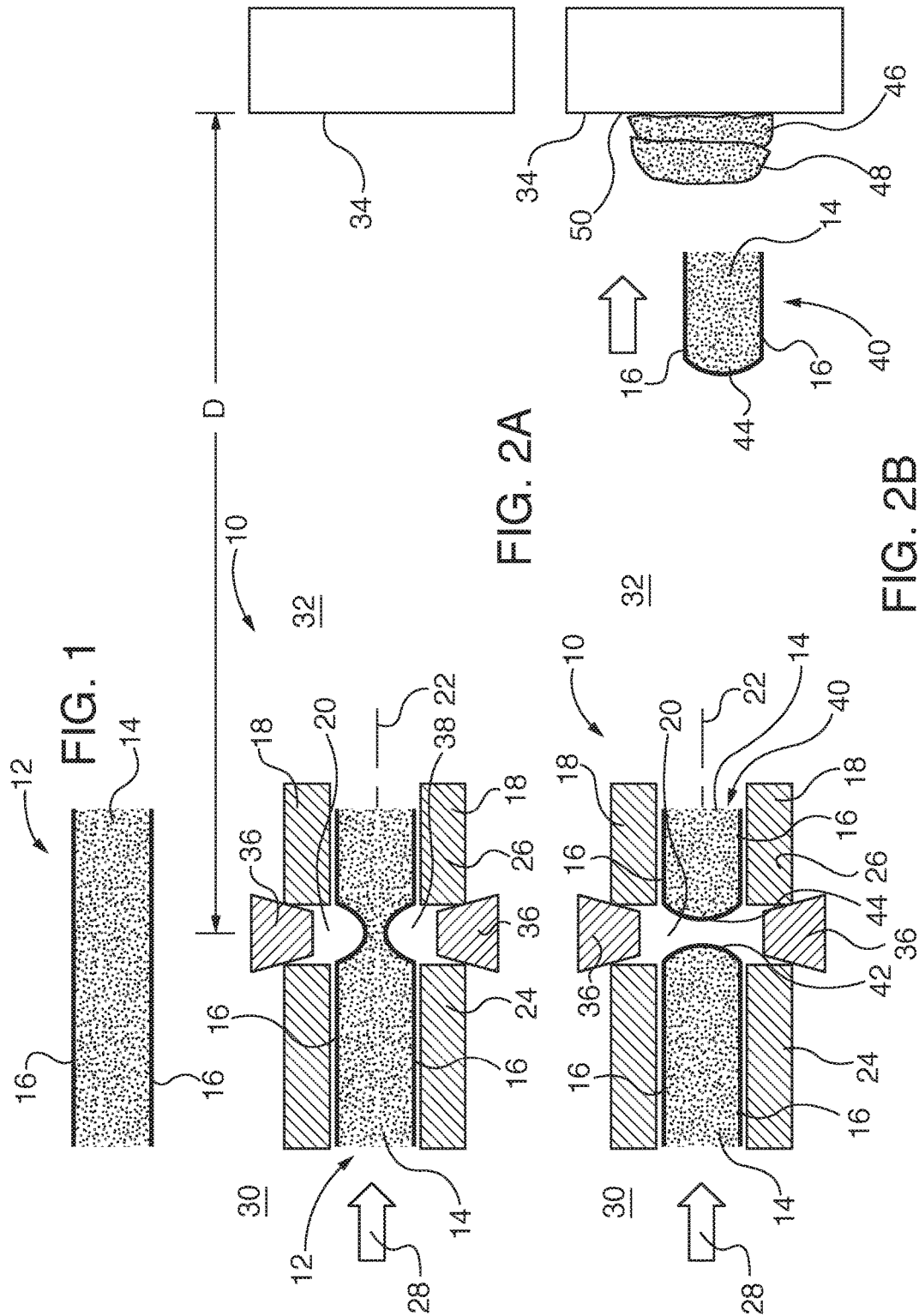

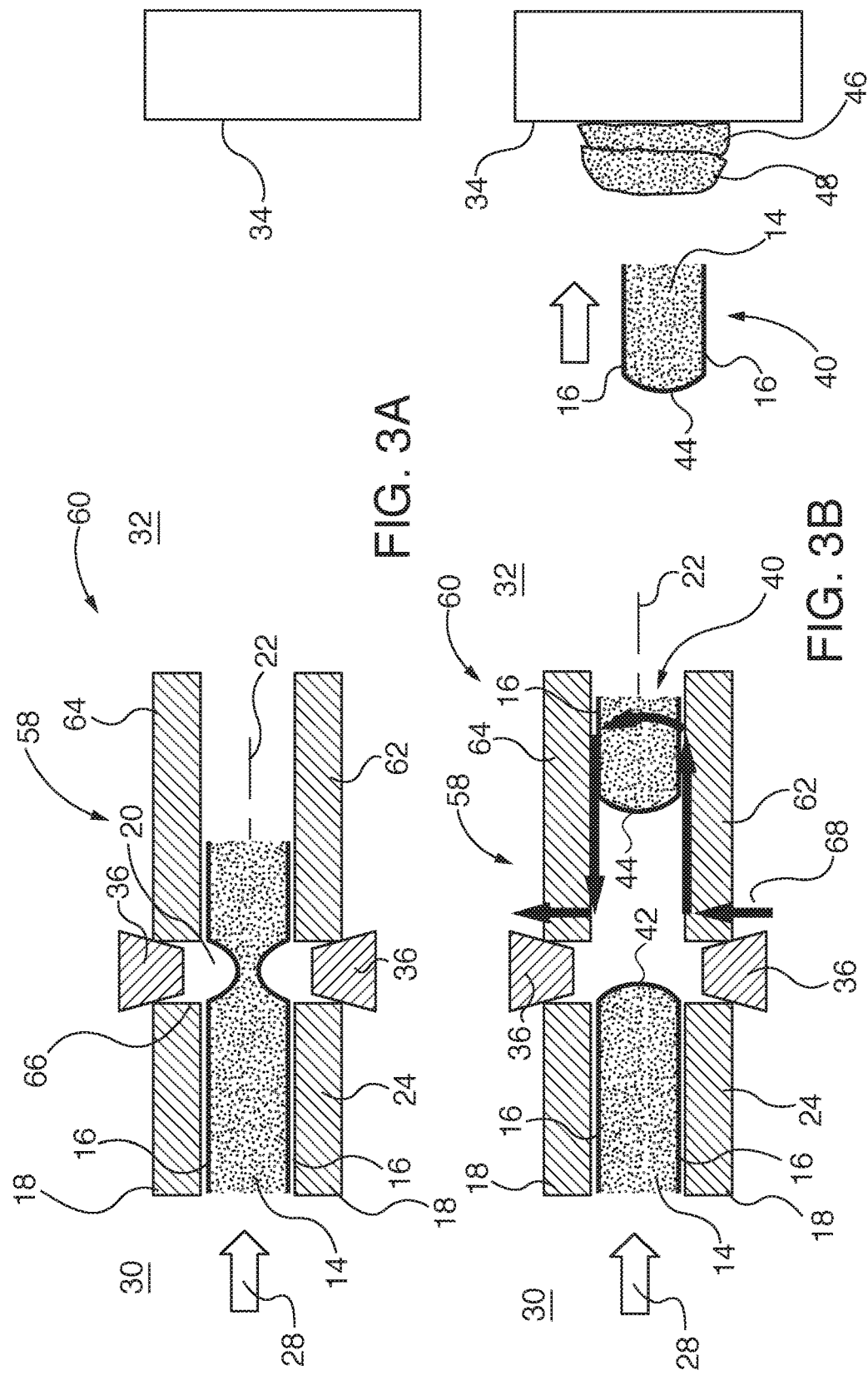

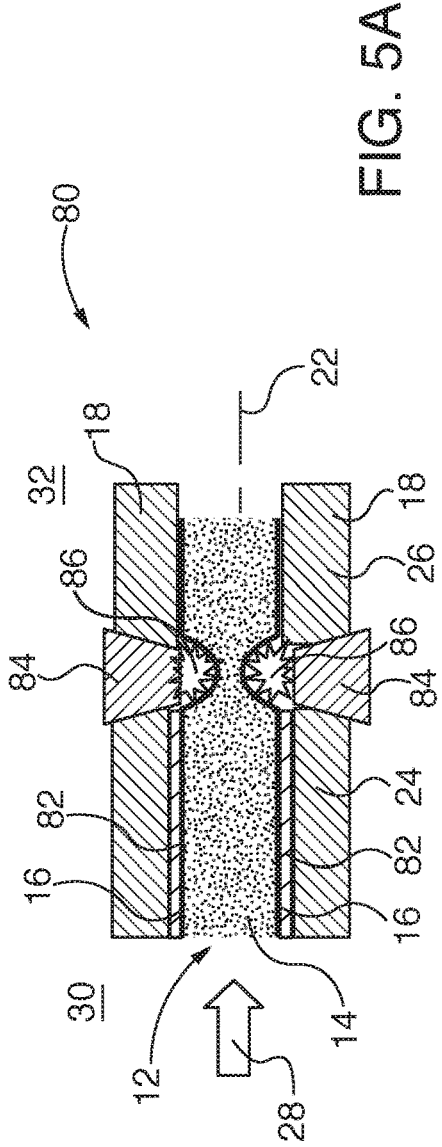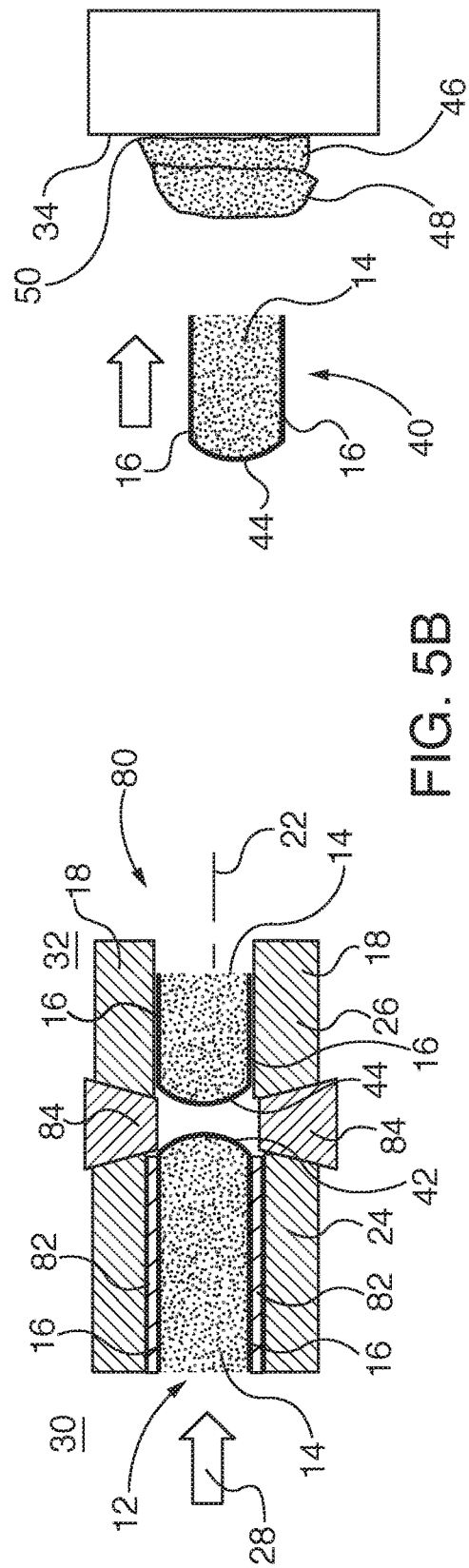

METHOD FOR SOLID STATE ADDITIVE MANUFACTURING

FIELD OF THE INVENTION

This invention relates to solid state additive manufacturing, and more particularly, to a method for forming an impact weld that includes providing a wire having a powder filler metal core located within a sheath and providing at least one energy pulse that interacts with the sheath to pinch off at least one segment of the wire, wherein the energy pulse causes propulsion of the segment toward a substrate with sufficient velocity to form an impact weld for welding the metal core to the substrate.

BACKGROUND OF THE INVENTION

Materials that are difficult to join and especially to additively deposit, such as certain dissimilar metals (e.g. aluminum to steel) and nickel based superalloys, present welding challenges. The term "superalloy" is used herein as it is commonly used in the art, i.e., a highly corrosion and oxidation resistant alloy with excellent mechanical strength and resistance to creep at high temperatures. Superalloys typically include high nickel or cobalt content. Examples of superalloys include alloys sold under the trademarks and brand names Hastelloy, Inconel alloys (e.g. IN 738, IN 792, IN 939), Rene alloys (e.g. Rene N5, Rene 80, Rene 142), Haynes alloys, Mar M, CM 247, CM 247 LC, C263, 718, X-750, ECY 768, 282, X45, PWA 1483 and CMSX (e.g. CMSX-4) single crystal alloys.

Challenges with respect to deposition during an additive manufacturing process are most frequently associated with high heat input fusion techniques such as arc welding, laser welding and others. Such challenges include precipitation of brittle phases, segregation formation and solidification cracking that may occur upon solidification of a weld. Further, strain age cracking may occur upon post weld heat treatment.

For example, gas turbine engine components, and particularly components of the engine exposed to the hot combustion gas, are subject to degradation during the operation of the engine. The degraded components are sometimes repaired by using an additive manufacturing process. It is desirable to provide an additive manufacturing process that avoids high heat input when repairing a turbine component.

SUMMARY OF INVENTION

A method for forming an impact weld used in an additive manufacturing process is disclosed. The method includes providing a wire having a powder filler metal core located within a sheath. The wire is then inserted within a conduit having an opening. Further, the method includes providing at least one energy pulse that interacts with the sheath to pinch off at least one segment of the wire, wherein the energy pulse causes propulsion of the segment toward a substrate with sufficient velocity to form an impact weld for welding the metal core to the substrate. In particular, the energy pulse may be an electromagnetic pulse, a laser energy pulse or a high electric current pulse.

Those skilled in the art may apply the respective features of the present invention jointly or severally in any combination or sub-combination.

BRIEF DESCRIPTION OF DRAWINGS

The teachings of the present disclosure can be readily understood by considering the following detailed description in conjunction with the accompanying drawings, in which:

FIG. 1 depicts a cored wire that includes a powder filler metal core located within a sheath for use in an additive manufacturing process.

FIGS. 2A-2B depict a magnetic pulse welding arrangement in accordance with an embodiment of the invention wherein the magnetic pulse welding arrangement forms a wire segment that is accelerated toward a substrate to form an impact weld.

FIGS. 3A-3B depict a railgun arrangement for use in conjunction with the magnetic pulse welding arrangement wherein the railgun arrangement also accelerates the wire segment.

FIGS. 5A-5B depict another embodiment of the invention wherein a vaporized foil actuator welding arrangement is used to form a wire segment that is accelerated toward a substrate to form an impact weld.

To facilitate understanding, identical reference numerals have been used, where possible, to designate identical elements that are common to the figures.

DETAILED DESCRIPTION

Figure 4A:
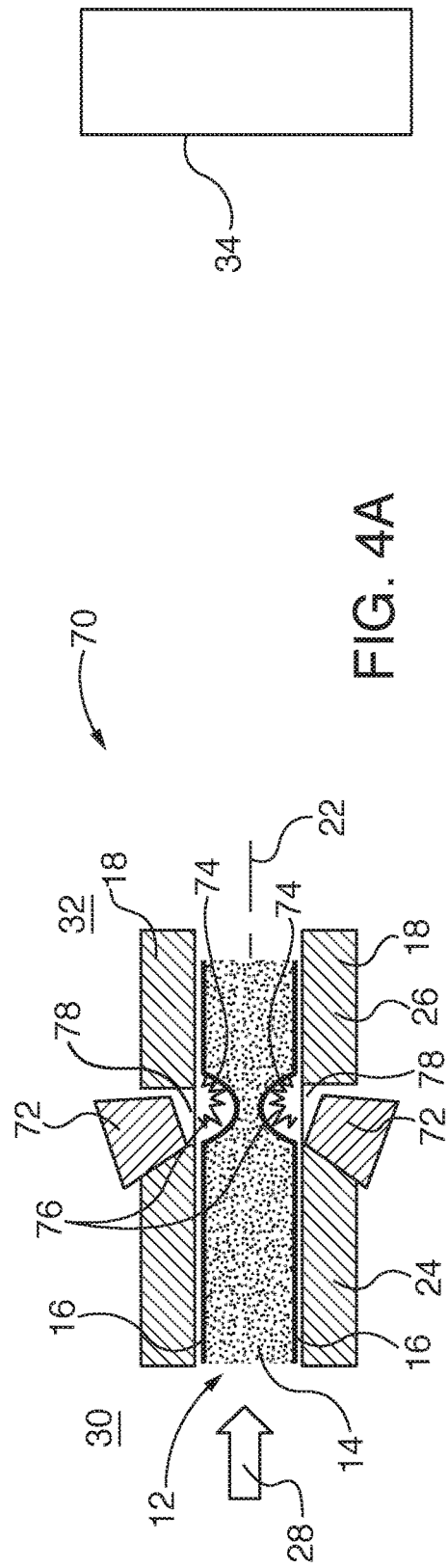
FIGS. 4A-4B depict an alternate embodiment of the invention wherein a laser impact welding arrangement is used to form a wire segment that is accelerated toward a substrate to form an impact weld.

Although various embodiments that incorporate the teachings of the present disclosure have been shown and described in detail herein, those skilled in the art can readily devise many other varied embodiments that still incorporate these teachings. The scope of the disclosure is not limited in its application to the exemplary embodiment details of construction and the arrangement of components set forth in the description or illustrated in the drawings. The disclosure encompasses other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

A magnetic pulse welding arrangement for use in an additive manufacturing process will now be described. In regard to magnetic pulse welding, the disclosure of U.S. Pat. No. 3,520,049 is hereby incorporated by reference. Aspects of a magnetic pulse welding process are used to pinch off segments of a cored wire 12 that includes a powder filler metal core 14 located within a sheath 16 (see FIG. 1). For example, the powder core material 14 may be of the type suitable for repairing superalloy components. The sheath 16 may be manufactured from a nickel based material and is compatible with a desired composition of the deposited core material. Further, a surface of the sheath 16 may include a small amount of an electrically conductive material such as copper. In particular, the sheath 16 may include a sufficiently thin flash of copper that does not significantly alloy with the deposited core material. Alternatively, the sheath 16 may include a thin coating of aluminum to provide electrical conductively for the sheath 16. It is noted that aluminum is used as an ingredient in many nickel based superalloys and thus would be compatible with the powder core material 14.

Referring to FIGS. 2A-2B, a magnetic pulse welding arrangement 10 for use in an additive manufacturing process is shown. Referring to FIG. 2A, the magnetic pulse welding arrangement 10 includes a conduit 18 (shown as a cross sectional view) that receives the wire 12. The conduit 18 includes a circular opening 20 oriented transverse to an axis 22 of the conduit 18 thereby dividing the conduit 18 into first 24 and second 26 conduit sections. The wire 12 is fed into the first conduit section 24 in a first direction (see arrow 28) from an upstream end 30 to a downstream end 32 toward a substrate 34. In particular, the wire 12 is fed past the opening 20 until a desired length of wire 12 is positioned in the second conduit section 26. The opening 20 exposes a circumferential portion 38 of the sheath 16. At least one magnetic coil 36 (shown as a cross sectional view in FIG. 2A) is circumferentially positioned relative to the opening 20 such that the coil 36 is located adjacent, the circumferential portion 38 of the sheath 16.

In operation, the coil 36 is energized so as to generate an electromagnetic pulse in a circumferential direction around the sheath 16 which causes the creation of eddy currents. For example, pulse duration may be in the order of microseconds. The electromagnetic pulse interacts with the sheath 16 to cause spaced apart portions of the sheath 16 to move toward each other until the sheath 16 is ruptured so that a portion of the wire 12 in the second conduit section 26 is cut or pinched off the wire 12. This forms a wire segment 40 including a portion of sheath 16 and the powder core material 14. A downstream end 42 of the remaining wire 12 in the first conduit section 24 and an upstream end 44 of the segment 40 are subsequently closed off by the sheath 16 due to plastic deformation of the sheath 16.

Opposing Lorentz forces accelerate the segment 40 toward the substrate 34 such that the segment 40 impacts the substrate 34 at a sufficiently high velocity to cause plastic deformation at an interface between the powder core material 14 and sheath 16 and the substrate 34. For example, the velocity at impact may be approximately 100 to 500 m/sec. Referring to FIG. 2B, this forms an impact weld that joins the powder core material 14 and sheath material and the substrate 34 thereby forming a first layer of core material 46. In a publication entitled "Welding Handbook", Volumes 1 and 2, published by the American Welding Society (AWS), explosion welding is defined, in part, as a solid-state process that produces a weld by high-velocity impact of the workpieces. Thus, the present invention utilizes aspects of explosion or impact welding in an additive manufacturing process. Further, little or no melting occurs except for possible minimal insipient local fusion. Additional segments 40 are then continuously pinched off from the wire 12, each propelled toward a previously formed layer of core material 46, i.e., an underlying layer, so as to incrementally form additional layers of core material for repairing a turbine component, for example. For purposes of illustration, FIG. 2B depicts first 46 and second 48 layers of core material.

The circumferential portion 38 and substrate 34 are separated by a standoff distance D (on the order of a few millimeters) to enable the segment 40 to achieve sufficient velocity and impact momentum to cause plastic deformation and bonding at the interface 50 between the core material 46 and the substrate 34. In addition, the coil 36 may be oriented so as to angle the electromagnetic pulse and, in turn, direct the Lorentz forces and thus the segment 40 in the downstream direction. Further, contaminants or oxides that may be present on the core material 46 and substrate 34 may be extruded or removed as a jet of material in the direction of interface closure and bond progression.

The wire 12 may be fed through the conduit 18 using a known wire feeder device. The wire feed and electromagnetic pulse repetition rates of the present invention correspond to the wire feed and reciprocation rates (i.e. metal transfers), respectively, of a conventional welding process. For example, in reciprocating cold metal transfer welding, wire is fed at a rate of approximately 2 to 8 m/min and a reciprocation rate may be approximately 20 to 200 times per second. Corresponding rates may be used for wire feeding and magnetically actuated projection in accordance with the present invention so as to provide a continuous succession of segments 40 for forming layers of core material 46, 48.

The magnetic pulse welding arrangement 10 shown in FIGS. 2A-2B may also be used in conjunction with a railgun arrangement 60 (see FIGS. 3A-3B) to propel the segment 40 toward the substrate 34. A railgun section 58 includes first 62 and second 64 spaced apart electrically conductive rails for receiving the segment 40. The first 62 and second 64 conductive rails are positioned downstream from a sheath end 66 to form the opening 20. The wire 12 is fed into the first conduit section 24 in the first direction 28 and toward the substrate 34. The wire 12 is fed past the opening 20 until a desired length of wire 12 is positioned in the railgun section 58. The coil 36 is energized so as to generate an electromagnetic pulse that interacts with the sheath 16 so that a portion of the wire 12 in the railgun section 58 is cut or pinched off the wire 12 to form the segment 40.

Referring to FIG. 3B, a pulse of high direct current 68 is conducted through the first rail 62, segment 40 and second rail 64. A Lorentz force then acts to propel the segment 40 toward the substrate 34 in accordance with a known railgun effect wherein the segment 40 serves as a railgun armature. The segment 40 is propelled toward the substrate 34 at a desired speed for forming an impact weld as previously described. Thus, the railgun arrangement 60 supplements the magnetic pulse welding arrangement 10. This enables the use of lower activation energies for generating the electromagnetic pulse.

Figure 4B:
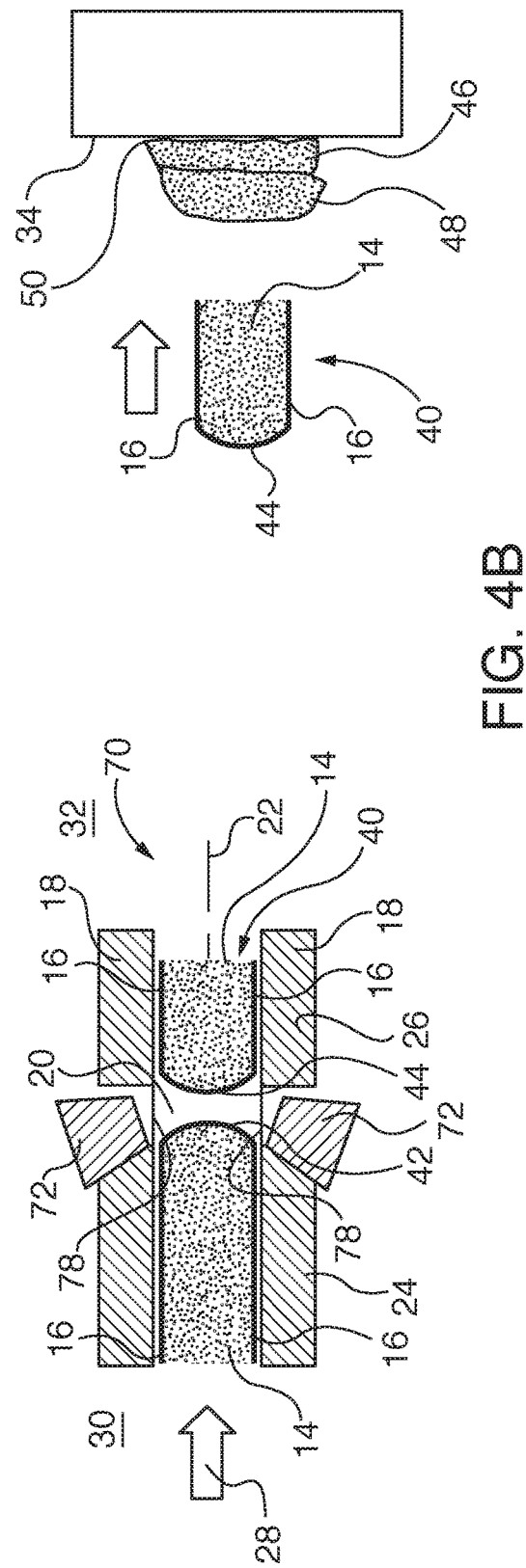

Referring to FIGS. 4A-4B, an alternate embodiment of the invention is shown. In this embodiment, a laser impact welding arrangement 70 is used that employs aspects of a known laser impact welding technique. The laser impact welding arrangement 70 includes at least one laser device 72 that generates a pulse of laser energy 74. The laser device 72 is circumferentially positioned relative to the opening 20 and is oriented such that a portion of the laser energy pulse 74 is directed downstream to assist in propelling the segment 40.

In operation, the laser device 72 is energized so as to generate a laser energy pulse that impinges on the sheath 16 to cause spaced apart portions of the sheath 16 to move toward each other until the sheath 16 is ruptured so that a portion of the wire 12 in the second conduit section 26 is cut or pinched off the wire 12 to form the segment 40. The surface of the sheath 16 ablates due to the laser energy pulse 74 to cause the generation of a gas 76 that produces a gas pressure that propels the segment 40 toward the substrate 34. The sheath 16 may also include an ablative material in order to enhance the formation of the gas 76 and further increase acceleration of the segment 40. Further, an optically transparent material 78 may be placed opposite the ablated surface 16 to provide a surface that opposes the generation of expanding gas 76 to also increase acceleration of the segment 40. It is noted that the sheath 16 in this embodiment does not need to be conductive.

The segment 40 impacts the substrate 34 at a sufficiently high velocity to form an impact weld that joins the powder core material 14 and sheath 16 and the substrate 34 thereby forming a first layer of core material 46 as previously described. Additional segments 40 are then continuously pinched off from the wire 12, each propelled toward a previously formed layer of core material, i.e., an underlying layer, so as to incrementally form additional layers of core material as previously described. In particular, suitable rates may be used for wire feeding and laser energy pulse generation so as to provide a continuous succession of segments 40 for forming layers of core material.

Referring to FIGS. 5A-5B, another embodiment of the invention is shown, in this embodiment, a vaporized foil actuator welding arrangement 80 is used that employs aspects of a known vaporized foil actuator welding technique. In this embodiment, a consumable material 82 is formed on the sheath 16 that vaporizes rapidly when subjected to a pulse of a high electric current. For example, the consumable material may be a metal foil layer 82 such as aluminum foil that is formed on the sheath 16. The vaporized foil actuator welding arrangement 80 includes at least one electrode 84 that generates a pulse of high electric current. The electrode 84 is circumferentially positioned relative to the opening 20 and is in contact with the foil layer 82.

In operation, the electrode 84 is energized so as to generate a pulse of a high electric current that is discharged into the foil layer 82. This causes rapid vaporization of the foil layer 82 and generates gas pressure 86 that causes spaced apart portions of the sheath 16 to move toward each other until the sheath 16 is ruptured so that a portion of the wire 12 in the second conduit section 26 is pinched of the wire 12 to form the segment 40. The gas pressure 86 also propels the segment 40 toward the substrate 34. The segment 40 impacts the substrate 34 at a sufficiently high velocity to form an impact weld that joins the powder core material 14 and the substrate 34 thereby forming a first layer of core material 46 as previously described. Additional segments 40 are then consecutively pinched off from the wire 12, each propelled toward a previously formed layer of core material, i.e., an underlying layer, so as to incrementally form additional layers of core material as previously described. In particular, suitable rates may be used for wire feeding and high electric current generation so as to provide a continuous succession of segments 40 for forming layers of core material. The foil layer 82 could be continuous on the wire 12 or could be intermittent and synchronized to the segments 40 of wire 12 to be propelled for solid state non-interrupted deposition on the substrate 34.

Thus, the present invention provides impact welding processes that are more controllable and amenable to continuous processing. In other embodiments, the wire 12 could be a solid core wire 12 and/or may be preheated wire 12. Further, the present invention may be used in gas and steam turbine repair and for the repair of highly stressed components operated at elevated temperatures (engines, motors, etc.)

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A method for forming an impact weld used in an additive manufacturing process, comprising:
   providing a wire having a powder filler metal core located within a sheath, the sheath having electrically conductive properties;
   inserting the wire within a conduit; the conduit having a circular opening forming a passageway penetrating through the side wall of the conduit;
   providing at least one electromagnetic pulse through the circular opening, wherein the electromagnetic pulse interacts with the sheath causing the sheath to rupture pinching off at least one segment of the wire, wherein the electromagnetic pulse propels the segment toward a substrate with a velocity to form an impact weld for welding the powder filler metal core and the sheath to the substrate,
   wherein the circular opening exposes a circumferential portion of the sheath.

2. The method according to claim 1, wherein the circular opening is oriented transverse to an axis of the conduit.

3. The method according to claim 1, wherein the sheath includes a flashing of copper.

4. The method according to claim 1, wherein a plurality of segments are continuously deposited on the substrate to form a plurality of layers on the substrate.

5. The method according to claim 1, wherein the circular opening and substrate are separated by a standoff distance to enable the segment to achieve the velocity for forming the impact weld.

6. The method according to claim 1, further including:
   providing first and second electrically conductive rails that receive the segment;
   providing a pulse of high direct current that flows through the first electrically conductive rail, the segment and the second electrically conductive rail to propel the segment toward the substrate.

7. A method for forming an impact weld used in an additive manufacturing process, comprising:
   providing a wire having a powder filler metal core located within a sheath, the sheath having electrically conductive properties;
   inserting the wire within a conduit; the conduit having a circular opening forming a passageway penetrating through the side wall of the conduit;
   providing at least one laser energy pulse through the circular opening, wherein the laser energy pulse interacts with the sheath to ablate the sheath and pinch off at least one segment of the wire, wherein the ablation generates gas pressure that propels the segment toward a substrate with sufficient velocity to form an impact weld for welding the metal core to the substrate,
   wherein the circular opening exposes a circumferential portion of the sheath.

8. The method according to claim 7, wherein a portion of the laser energy pulse is directed toward a downstream end of the conduit to assist in propelling the segment.

* * * * *